United States Patent Office 3,302,430
Patented Feb. 7, 1967

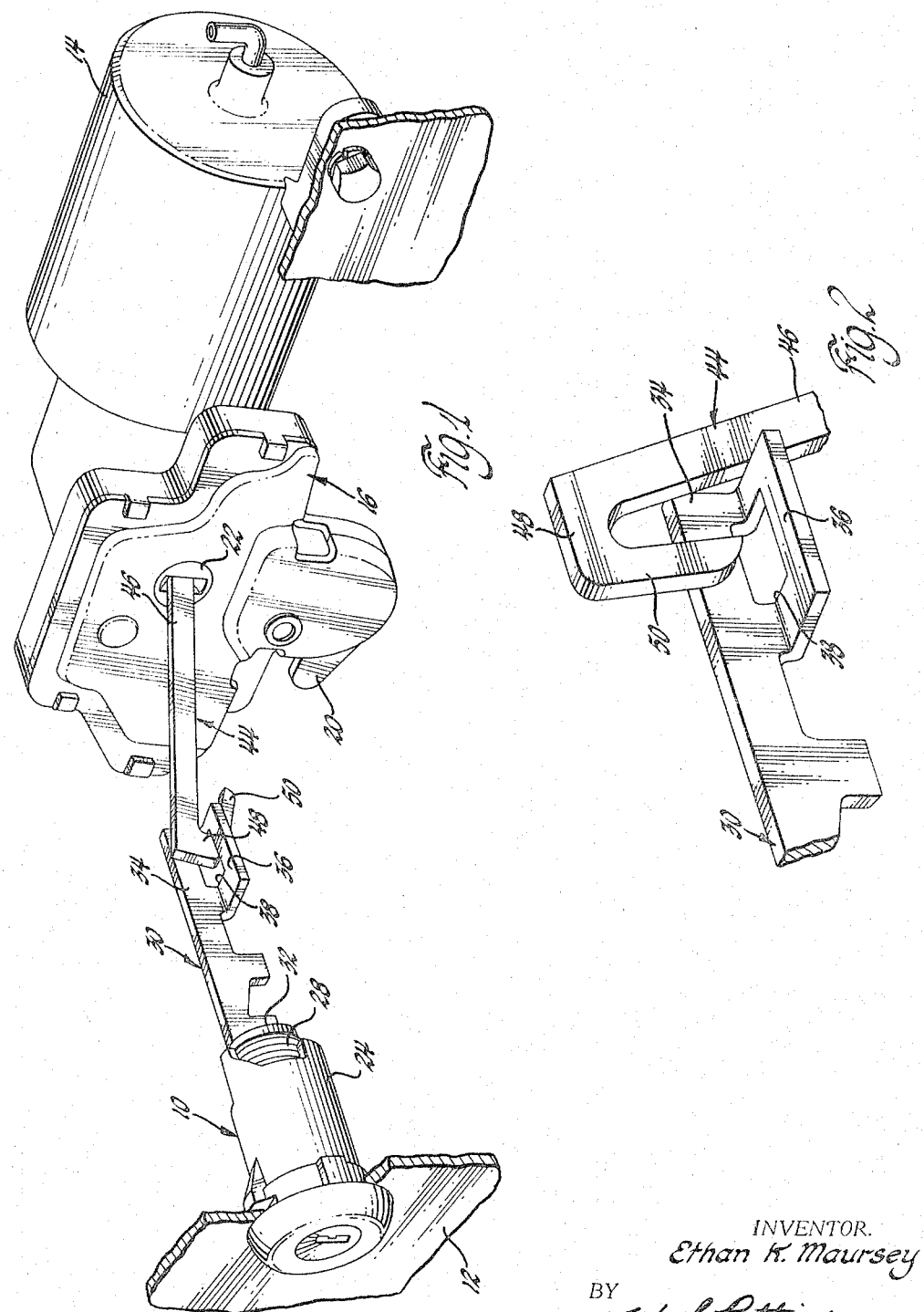

3,302,430
COUPLING
Ethan K. Maursey, Warren, Mich., assignor to General Motors Corporation, Detroit, Mich., a corporation of Delaware
Filed July 13, 1965, Ser. No. 471,562
4 Claims. (Cl. 64—6)

This invention relates to couplings and more particularly to an improved torque transmitting coupling.

One feature of this invention is that it provides an improved transmitting coupling of extremely simple and economical manufacture. Another feature of this invention is that the coupling is comprised of but two parts which may be fabricated entirely of flat stock and which have interlocking portions which engage in such a manner as to additionally provide for selected degrees of rotational lost motion and axial misalignment between the parts.

These and other features and advantages of the invention will be readily apparent from the following specification and the drawings wherein:

FIGURE 1 is a fragmentary perspective view of a vehicle body latch system including a coupling according to this invention connecting an outside lock cylinder actuator to the latch; and FIGURE 2 is an enlarged view of a portion of FIGURE 1.

With more specific reference to FIGURE 1, there is shown certain of the major components of a vehicle body deck lid latch system of the type adapted for either normal manual outside actuation or release of the latch, as by an actuating cylinder lock assembly 10 mounted on the exterior or outer panel 12 of the vehicle body deck lid, or by a remotely controlled vacuum motor 14 or similar power operated unit sutiably mounted in association with the deck lid latch 16.

Latch 16 may be of many known types, but as herein disclosed, it is generally similar to that disclosed in U.S. Patent 2,886,365, issued to R. M. Fox et al. on May 12, 1959. Reference may be had to this patent for the details of the structure and operation of the latch, but generally it includes a rotary forked bolt 20 adapted for interlocking cooperation with a striker, not shown, mounted on the vehicle body. The bolt is held in latched position by suitable detent means which are spring biased into detenting cooperation with the bolt and which are adapted to be released therefrom by a suitable cam or rollback 22, indicated in FIGURE 1, rotatably mounted in the frame of the latch. The rollback is operative upon rotation thereof in a clockwise direction to release the detent means for freedom of bolt 20.

The operating component or plunger of vacuum motor 14 is suitably connected to rollback 22 in a manner not shown, whereby, upon application of vacuum to the motor the rollback is rotated for release of the latch. Although the vacuum motor and its connection to the rollback are shown as being located to the side of the latch opposite lock cylinder 10, the motor may be located to the other or outer side of the latch as will later appear.

Lock cylinder 10 is of conventional construction and includes a casing 24 suitably nonrotatably secured to panel 12 and an inner plug or core indicated at 28 being rotatably mounted within the casing. Suitable tumbler means within the plug 28 restrain rotation thereof within the casing unless through insertion of a properly coded key, not shown.

A coupling assembly according to this invention for connecting lock cylinder 10 to rollback 22 includes a first member 30 fabricated of flat stock and provided at its outer end 32 with suitable means adapted for nonrotatable interconnection with plug 28. Such connecting means are conventional and well known and will not be specifically described herein. At its other end, member 30 is provided with a first flat flange portion or abutment face 34 having bent therefrom a second generally flat flange portion 36. An aperture 38 is provided through both flanges and includes a first portion respective to flange 34 and a second portion respective to flange 36. A second coupling member 44 adapted for cooperation with member 30 is again fabricated of flat stock and includes a shaft portion 46 inserted at its inner end within a complementary central aperture of rollback 22 for nonrotatable connection therewith. The other end of member 44 is generally hook-shaped and includes a downwardly or radially directed leg portion 48 merging with a return bent portion 50. In assembly, this hook-shaped end of member 44 is inserted into aperture 38 in the manner shown in FIGURE 2. As there seen, the return portion 50 is initially formed substantially straight for convenient insertion, but thereafter, as seen in FIGURE 1, the end of this portion may be slightly staked or turned upwardly toward shaft 46 to prevent free withdrawal from member 30.

As seen best in FIGURE 2, each portion of aperture 38 extends in its respective flange from the line of intersection between the flanges approximately only to an extent equalling the stock thickness of leg portion 48. Assuming now that rollback 22 is to be rotated clockwise by vacuum motor 14 for release of latch 16, it will be seen that there must be an accompanying rotation of member 44 relative to member 30 inasmuch as the lock cylinder plug 28 is held in locked position. This lost motion or freewheeling movement of member 30 arises from the angularly related portions of aperture 38 which, with rotation of shaft 36 generally about an axis imagined between lock cylinder 10 and rollback 22, permit turning of leg portion 48 to the extent of the predetermined angularity between flanges 34 and 36. The full range of freewheeling movement of members 44 is thus that which obtains between the position of member 44, indicated in FIGURE 1, wherein the leg portion flushly engages flange 34 and is located wholly within the aperture portion of flange 36, and the opposite or 90° clockwise displaced position wherein the leg flushly engages flange 36 and is wholly within the aperture portion of flange 34. By extending each aperture portion only to the extent of the thickness of leg portion 38, unnecessary lost motion is avoided.

For actuation of latch 16 by lock cylinder 10, it is seen that clockwise rotation of member 30 from the position shown by the lock cylinder causes opposing engagement of or torque application to leg portion 48 by the face of flange 34 and the opposing aperture edge of flange 36, thereby to transmit rotation through member 44 to rollback 22. The coupling is, of course, installed as shown in the normal or nonactuated position of the parts wherein leg 48 lies closely adjacent flange 34 so that transmission of rotation will be immediate.

It is to be noted that the gap or bight between return portion 50 and shaft 46 may be adjusted for looseness as desired, but in a latch installation such as that shown herein, it is normally desirable that such bight be sufficient to permit a limited degree of axial misalignment between members 30 and 44 to accommodate installation tolerances.

As mentioned, it is equally feasible that vacuum motor 14 may be located to the opposite or outer side of the latch 16 and provided with appropriate connection directly to the member 44. Again, actuation of motor 14 is accompanied by lost motion or freewheeling of member 44 relative to member 30.

Having thus described my invention, what is claimed is:
1. In a coupling for transmitting torque about an axis, a first member including a pair of generally planar abut- ment face means formed radially of said axis, said face means extending at a predetermined included angle from a line of intersection therebetween located generally along said axis, said member having an aperture through both said face means extending a substantial distance to either side of the line of intersection therebetween, and a second member lying generally along said axis and including leg means directed radially therefrom for reception within said aperture, said face means being engageable with said leg means to transmit torque between said members, said leg means being sufficiently smaller than said aperture as to be capable of freewheeling therein generally to the extent of the angularity between said face means to permit a like degree of rotation of one of said members independently of the other.

2. In a coupling for transmitting torque about an axis, a first member including a pair of generally flat flanges formed radially of said axis, said flanges extending at a predetermined included angle from a line of intersection therebetween located generally along said axis, said member having an aperture through both flanges extending a substantial distance to either side of the line of intersection therebetween, and a second member lying generally along said axis and including leg means directed radially therefrom for reception within said aperture, said flanges being engageable with said leg means to transmit torque between said members, said leg means being sufficiently smaller than said aperture as to be capable of freewheeling therein generally to the extent of the angularity between said flanges to permit a like degree of rotation of one of said members independently of the other.

3. A coupling as recited in claim 2 wherein said leg means includes hook retention means preventing free withdrawal of said leg means out of said aperture, said hook means being formed with a sufficiently large bight as to permit limited axial misalignment between said members.

4. In a coupling for transmitting torque about an axis, a first member including a pair of generally flat flanges formed radially of said axis, said flanges extending at a predetermined included angle from a line of intersection therebetween located generally along said axis, said member having an aperture through both said flanges extending to either side of the line of intersection therebetween, and a second member lying generally along said axis and including a flat hook-shaped end portion received within said aperture to embrace said first member, said flanges being engageable with said end portion to transmit torque between said members, the portion of said aperture lying in each of said flanges being of a radial dimension generally equalling the thickness of said end portion whereby said end portion is capable of freewheeling therein generally to the extent of the angularity between said flanges to permit a like degree of rotation of one of said members independently of the other, said end portion being formed with a sufficiently large hook bight as to permit a limited axial misalignment between said members.

References Cited by the Examiner
UNITED STATES PATENTS

| | | | |
|---|---|---|---|
| 2,394,384 | 2/1946 | Horstmann | 74—625 |
| 2,580,026 | 12/1951 | Jacobi | 74—504 |
| 3,154,968 | 11/1964 | Daugherty | 74—625 |

FRED C. MATTERN, JR., *Primary Examiner.*

H. C. COE, *Assistant Examiner.*